Fig. 3.

Aug. 26, 1947.  T. W. SPRAKE  2,426,374
MARINE-VESSEL STEERING APPARATUS
Filed July 20, 1942  9 Sheets-Sheet 6

Fig. II.

Aug. 26, 1947. T. W. SPRAKE 2,426,374
MARINE-VESSEL STEERING APPARATUS
Filed July 20, 1942 9 Sheets-Sheet 8

INVENTOR.
Tyler W. Sprake
BY
atty

Patented Aug. 26, 1947

2,426,374

UNITED STATES PATENT OFFICE 2,426,374

MARINE-VESSEL STEERING APPARATUS

Tyler W. Sprake, Seattle, Wash., assignor to Webster-Brinkley Co., Seattle, Wash., a corporation of Washington Application July 20, 1942, Serial No. 451,678

15 Claims. (Cl. 60—52)

This invention relates to hydraulic steering mechanism for marine vessels, and especially mechanism of the character providing dual operating systems, the usual installation in this class of mechanism being one in which a cross-arm forming the tiller for the rudder stock connects at each of its two ends with actuating rams of the respective systems.

For its general object the invention aims to provide a perfected dual-system steering mechanism and, to the end of attaining this general objective, has certain other and more particular objects and advantages which will appear and be best understood by considering, in a preliminary way, the functional nature of my improvements.

It may be here stated that the purpose in pluralizing steering machinery upon a marine vessel is two-fold: firstly, to accelerate the rudder action and reduce back-lash by motivating the tiller from two simultaneously acting rams working in opposite directions upon respective lever arms of the tiller, and secondly, to permit the repair of any defective part of either of the dual systems, without laying the vessel to, by the ability to work the rudder from the remaining system. It becomes obvious, if the latter said end be accomplished, that each of the two systems must be an entity, which is to say that every part of the one system must find its functional counterpart in the other system—there being no single vulnerable part common to both systems upon which the same need depend.

Digressing from the present advance and pointing out disadvantages of prior twin-ram steering assemblies in order to clarify my improvements, there have been two objectionable characteristics in the customary dual-system arrangements. One such objection lies in the fact that the desired peak efficiency for which the dual systems are engineered—obtained by the simultaneous motivation of both rams—is possible only when all of the parts of both systems are in operation, wherefor excessive wear results causing more frequent repairs. The second objection follows as a matter of course, in an assembly which requires the isolation of an entire effected side for the repair of any single part thereof, namely that any repair operation upon a component part of either system results in an impairment of the efficiency of the vessel's steering equipment during the period needed to complete repairs. By this I mean that the vessel during such period is forced to rely upon the motivating influence of but one of the rams, the other ram being either disengaged from the related arm of the tiller or allowed to idle by the instrumentality of permitting free passage of its hydraulic fluid from one to another of the opposite-ly mounted end cylinders therefor.

It is one of my objective aims to provide a dual-system steering mechanism in which, as heretofore, two entirely independent systems are provided but which is characterized in that vulnerable parts of both systems, selectively as between the systems, are caused to normally perform double-duty work permitting the functional counterpart in the other and complementing system to be isolated while still maintaining the desired motivation of the tiller from both rams. Aside from the ability to freely repair the machine components of either side of the steering equipment, excepting only the rams themselves and independent control valves therefor which by their nature are relatively proof against damage, without interfering with the hydraulic motivation of the related ram, I additionally prolong the life of the equipment correspondingly with the degree to which wear is reduced by permitting an alternating usage of the two systems. Appreciating, however, that one of the rams or its control valve may be in need of repair, and as an accommodation thereto, the present invention has the further advantage of permitting the said control valve and its ram to be isolated from the other control valve and the latter's ram and the system then operated by the use of a single ram during the period of time required for the repair operation.

With the foregoing general objects in view, and having still further and more particular objects and advantages in mind which will become apparent in the course of the following description and in the claims thereto annexed, the invention consists in the novel construction and in the adaptation and combination of parts illustrated in the drawings and hereinafter described and claimed.

Figure 1:
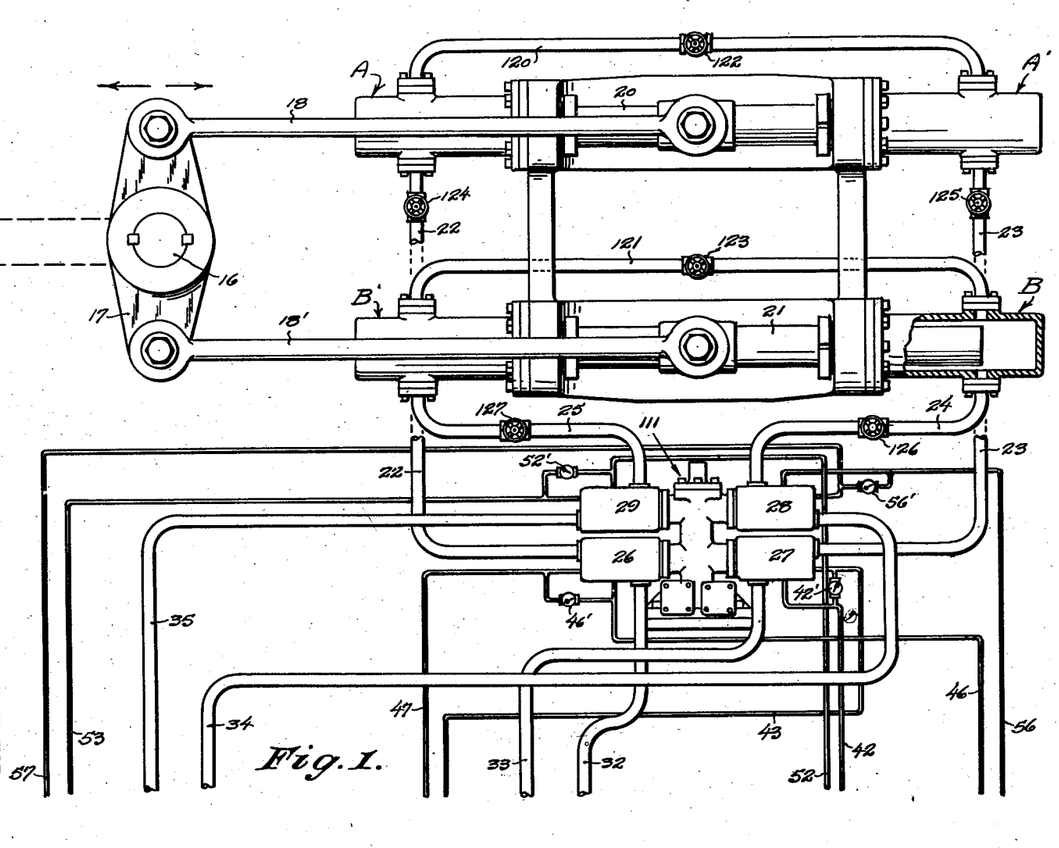
Figures 1 and 2 are each schematic plan views which, taken together, represent a combination of parts constituting a steering mechanism according to the now preferred embodiment of the invention.
Figure 2:
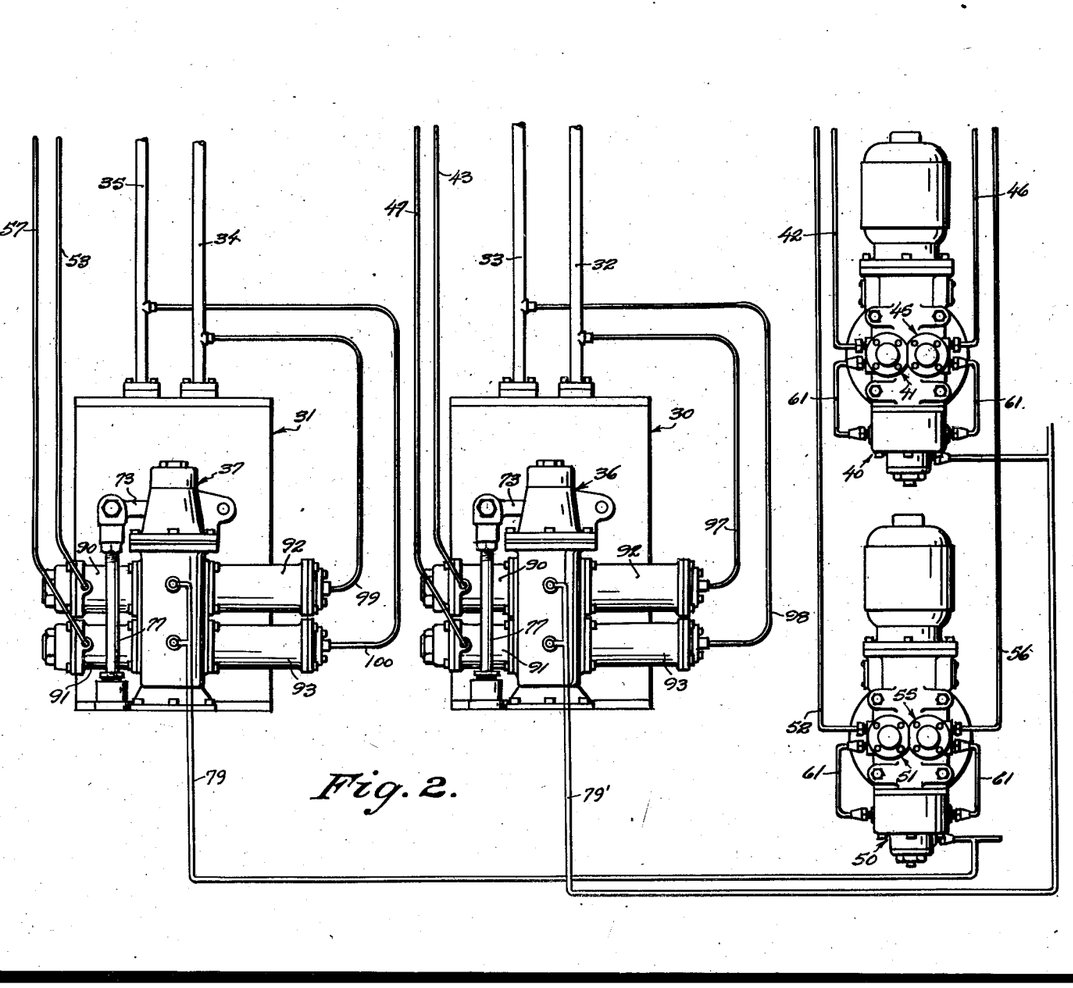
Figure 3:
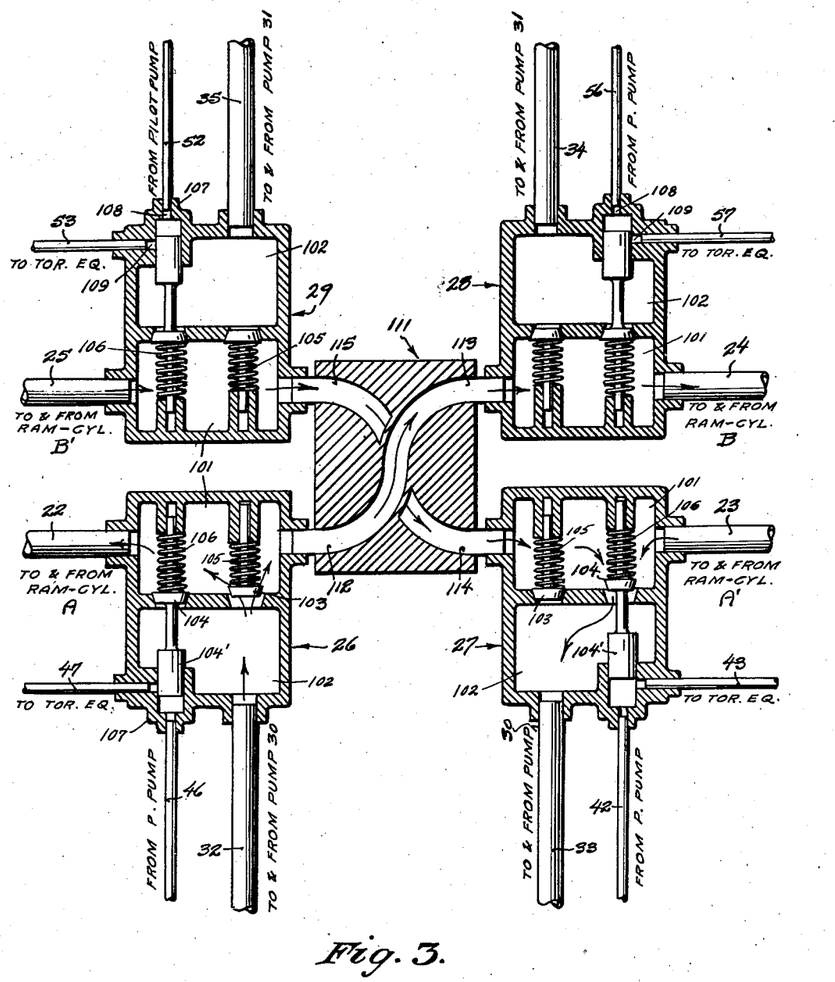
Fig. 3 is an enlarged horizontal sectional view, similarly somewhat schematic, illustrating the distribution valves and cross-over structure of my invention and which, to all intents and purposes, may be considered as the nerve center of the steering assembly.
Figure 4:
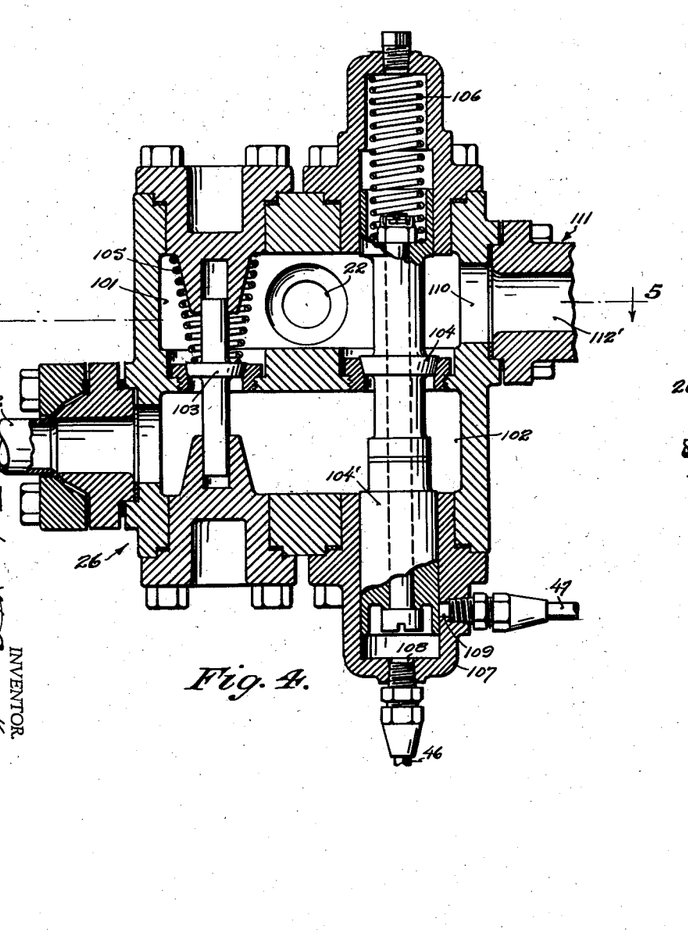
Fig. 4 is a longitudinal vertical section through one of the distribution valve devices—taken on line 4—4 of Fig. 5—and including a fragmentary showing of the various connections.
Figure 5:
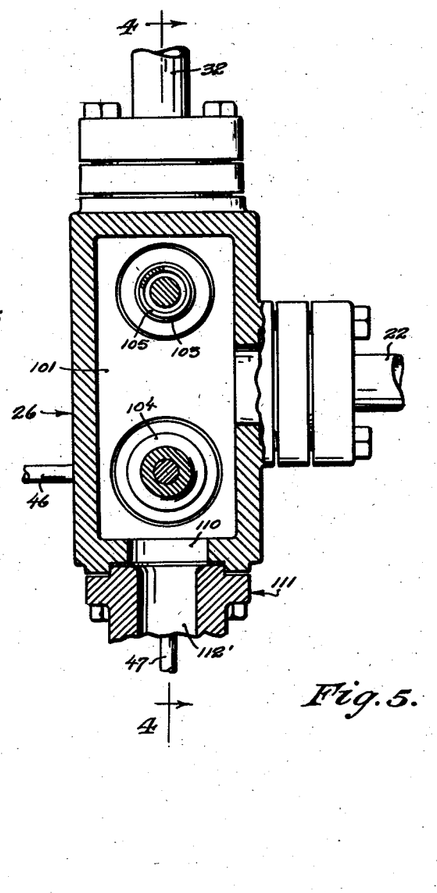
Fig. 5 is a horizontal section on line 5—5 of Fig. 4.
Figures 6, 7:
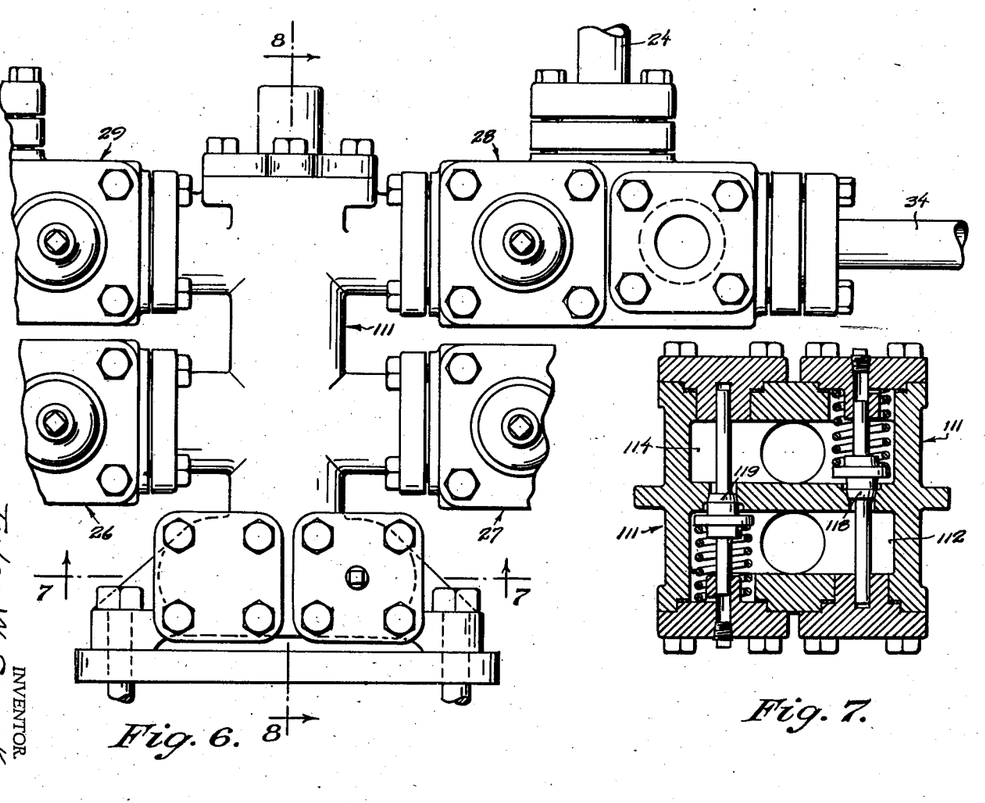
Fig. 6 is a fragmentary top plan view of the distribution valves and cross-over shown in the schematic views 1 through 3, inclusive.
Fig. 7 is a longitudinal vertical section on line 7—7 of Fig. 6 detailing the spring-closing safety valves which are employed with the cross-over for by-passing fluid upon the development of excessive pressure in a flow line.

With reference being had to said drawings, 16 designates the rudder post of the vessel having a tiller 17 thereon and connecting by driving arms 18—18' with hydraulic engines comprised of the rams 20 and 21 working, respectively, in opposed cylinders which I denote by the letters A and A' for the ram 20 and B and B' for the ram 21. Connecting with these cylinders are the pipes 22, 23, 24 and 25 which lead to respective distribution valves 26, 27, 28 and 29. These distribution valves can be considered as being hooked up in pairs and with related primary pumps, as 30 and 31, producing two fluid circuits, connection being had by pipes 32 and 33 from the two sides of one of said pumps to the valves 26 and 27, respectively, and by pipes 34 and 35 from the two sides of the other of said pumps to the valves 28 and 29, respectively. These two fluid circuits are each entirely self-sufficient—by which I mean that neither of the rams is dependent upon the valves of the other ram for operation— and will, for the present, be treated as independent systems although it is fundamental to the present invention that either said pump be caused to operate as the motivating agent for both rams, the structure responsible therefor essentially comprising cross-over connections from the valve 26 to the valve 28, and from the valve 27 to the valve 29, hereinafter more particularly described.

The primary pumps are of the reversing variable-delivery type, and are governed by torque-equalizing units denoted generally by 36 and 37 and which in turn are controlled by the pressure of fluid within pointer lines, there being two such pointer lines for each unit acting by pressure transmitted from the one to cause the prime body of fluid to flow in one direction through the primary pump related thereto and by pressure transmitted from the other to cause a reverse flow of the prime fluid body. Parent to each pointer line is a pilot pump, and controlling the fluid flow from the pilot pump is a pilot valve actuated by suitable means such, for example, as a Selsyn motor.

For a purpose which will become apparent in the following detailed description of the distribution valves, each pointer line leads from the pilot valve therefor to a related distribution valve and from the latter leads to the torque-equalizing unit, and giving designation to the pointer lines for the primary pump 30 I indicate a pilot pump 40, a pilot valve 41, a pipe 42 connecting through distribution valve 27 with a pipe 43 as one said pointer line. Employing the pilot pump 40 as a common element, the other pointer line of the primary pump 30 is comprised of the pilot valve 45 and the pipes 46 and 47 which connect through the distribution valve 26. Similarly traced, the pointer lines for the other primary pump—operating through the torque-equalizing unit 37— consist on the one hand of a pilot pump 50 connecting through a pilot valve 51 with pipes 52—53 and on the other hand of the pilot pump 50 connecting through a pilot valve 55 with pipes 56— 57. Extending between the two pipes of each said pointer line as a by-pass about the distribution valve 26, 27, 28, or 29, as the case may be, are suitable connections respectively fitted with a check-valve, as 42', 46', 52', and 56' (Fig. 1), the purpose thereof being to pass a return flow of pressure oil within said pointer lines about the related distribution valves and which will be understood in the course of the following description. These check valves are caused to close with the pressure of the related pump 40 or 50, and normally, and which is to say in the absence of pressure from this pump, are made to open through suitable means as, for example, springs or gravity to obtain communication from pipe 43 to pipe 42, from pipe 47 to pipe 46, from pipe 53 to pipe 52, and from pipe 57 to pipe 56. In so far as the portrayal of the system in Figures 1 and 2 is concerned, each check valve is illustrated in its normal open position (the pumps 40 and 50 being inactive), and namely a position accomplishing communication between the related pipes 43—42, 47—46, 53—52, and 57—56.

Figure 11:
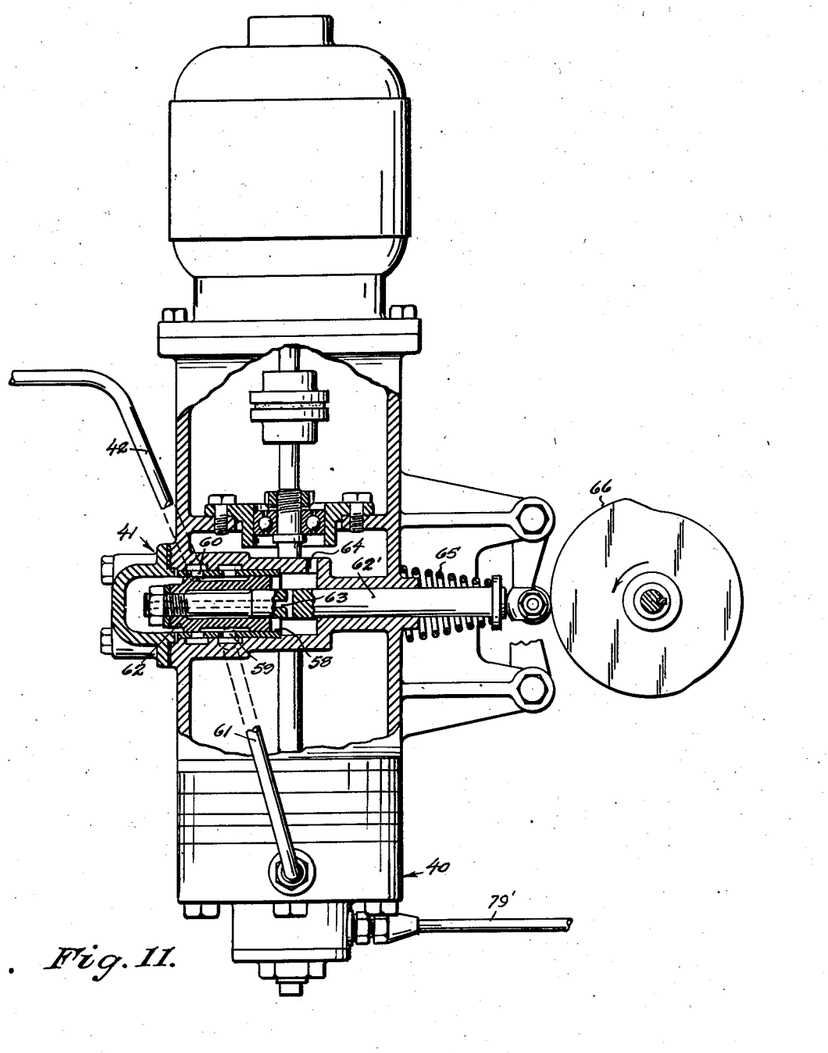
Fig. 11 is a view partly in elevation and partly in vertical section showing a pilot valve and complementing pilot pump which, by operative connection with a related distribution valve, governs the latter to control the directive course of a pressure flow of ram-driving fluid.

Now describing in detail the parts which have been hereinbefore generally referred to, it will be seen (Fig. 11) that the pilot valve consists of a valve cylinder 58 having wall ports 59 and 60 of which the former connects with a pipe 61 leading from the related pilot pump, and of which the latter connects with one of the pipes 42, 46, 52, or 56, according as to which pointer line is concerned. Received within the cylinder upon a stem 62' is a shuttle valve 62 serving, by forward movement, to connect the port 59 with the port 60 and, by return movement, to connect the port 60 through an end-bore 63 of the stem with a chamber formed at the inner end of the cylinder and which in turn communicates by a port 64 with the supply chamber of the pilot pump. The stem is urged forwardly in opposition to a spring 65 by a cam, as 66, operated by the referred to Selsyn motor. As indicated in Fig. 2, a pilot pump with its related pilot valves are mounted within a common housing disposing the stems for the shuttle valves transversely as respects the housing in paralleling relation at opposite sides of the longitudinal median line of the housing. While not illustrated, the two cams—one for each of the two complementary shuttle stems—lie in side-by-side relation and are given corelative action such that one cam is inactive to its related shuttle valve during operation of the other. It is further provided that the action of the cams for one of said paired pilot valves, 41 and 45 for example, correspond with the cam action which is responsible for the actuation of the other paired pilot valves 51—55 to preclude—in the event of an operator desiring to actuate both of the primary pumps in coincidence—conflict as between the two rams. It is, however, here pointed out that the assembly is normally operated by the use of only one primary pump, the operator by such token employing the paired pilot valves, either 41—45 or 51—55, selectively.

Reverting to the torque-equalizing units by means of which the selected pair of pilot valves are caused to activate the primary pump related thereto—reference being had to Figs. 12 through 15, inclusive—there is provided for each said unit a slidably mounted shaft 70 working through a gland 71 with the upper end exposed and the lower end received within an oil chamber 72. Received through a slot in said exposed end is a lever 73 which connects by a pin 74 therewith and has one of its ends pivoted as at 75, the other end being given a wrist connection as at 76 with the forked end of a control rod 77 operative to the related primary pump 30 or 31 as the case may be. The action is one in which the volumetric flow of the pump is governed by the degree of movement of the control rod which, acting in one direction responsive to movement of the shaft 70, causes the hydraulic fluid to be pumped in one direction and, upon a movement of the control rod beyond neutral in the opposite direction, reverses the directional flow of the fluid.

Figures 12, 13:
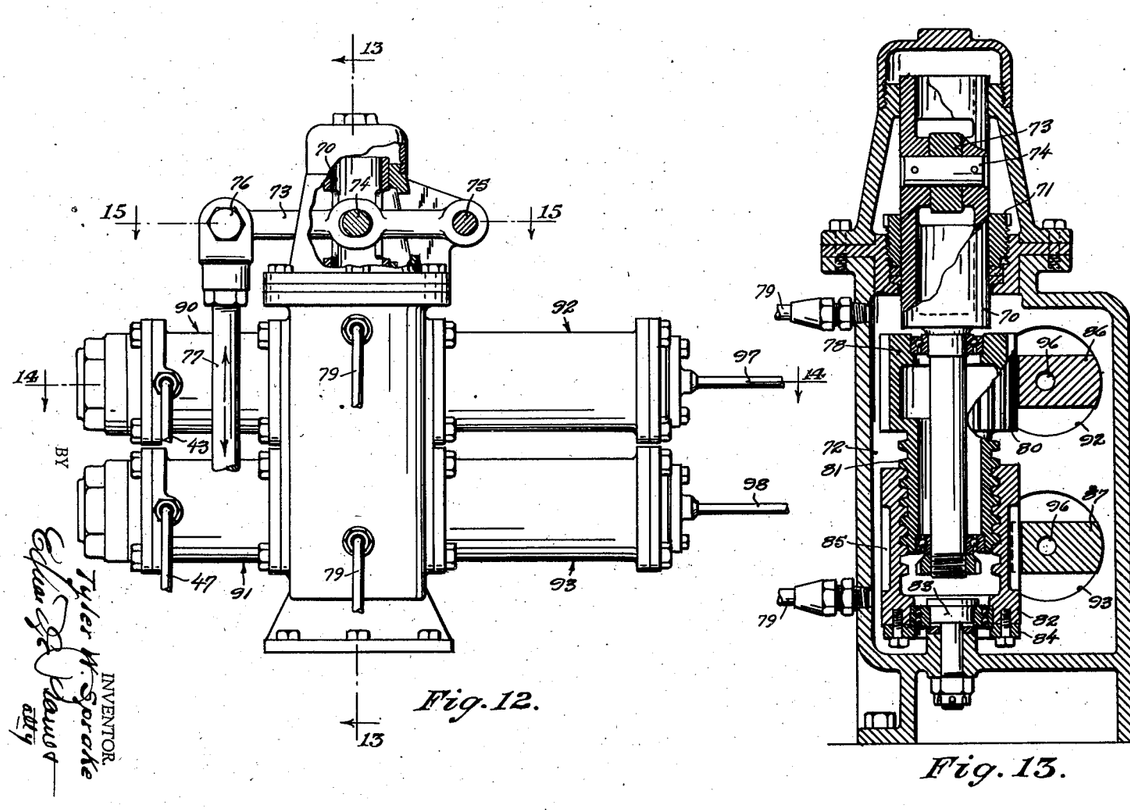
Fig. 12 is a fragmentary side elevational view of the torque-equalizing unit provided for each of my two systems, and which functions to govern the operation of a primary pump utilized to drive the rams.
Fig. 13 is a transverse vertical section on line 13—13 of Fig. 12.
Figures 14, 15:
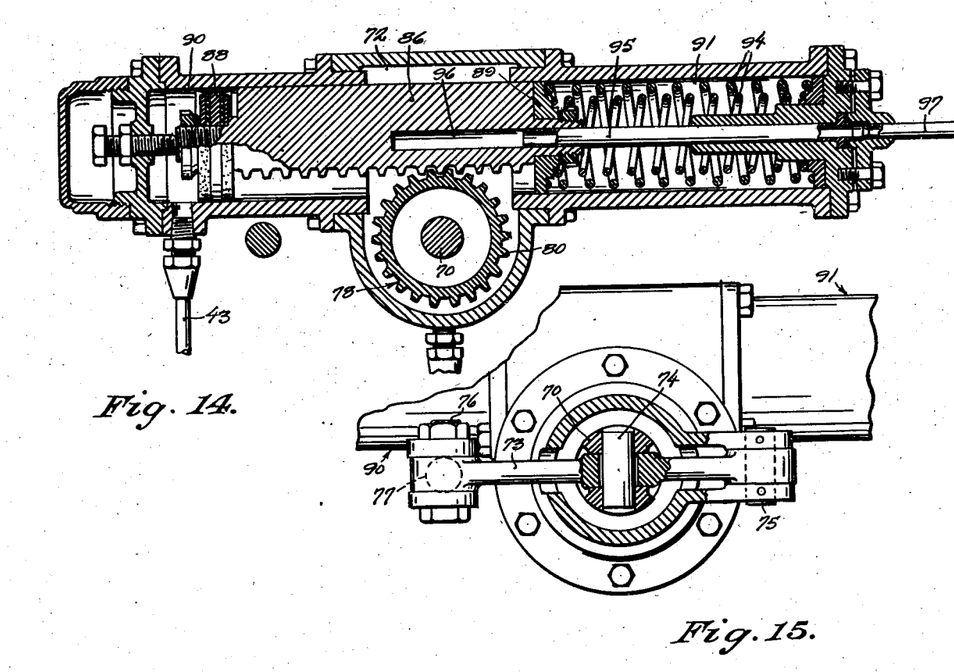
Fig. 14 is a horizontal section on line 14—14 of Fig. 12.
Fig. 15 is a fragmentary detail horizontal section on line 15—15 of Fig. 12, all of such views 13, 14 and 15 being taken to an enlarged scale.

Noting particularly Figs. 13 and 14, it will be seen that there is revolubly mounted upon said lower end of the shaft and held against relative axial movement a thimble 78 having a pinion 80 and a worm 81 formed upon the same at its upper and lower ends. As a complement to this worm there is provided an internally threaded sleeve 82 revolubly carried by a stud 83 fixedly received through the bottom wall of the chamber and restrained against end movement by a retaining ring 84. The counterpart of the pinion 80, designated by 85, is formed upon the sleeve. In mesh with these pinions 80 and 85 are respective racks 86 and 87 disposed to lie in paralleling relation and each fitted, at the two ends, with a piston 88 and a thrust-disc 89. Cylinders for these pistons and thrust-discs project horizontally from opposite sides of a central housing and, for the pistons, are denoted by 90 and 91 and, for the thrust-discs, by 92 and 93. Leading to the former such cylinders are the pipes 43 and 47, respectively, or the pipes 53 and 57 according as to whether the torque-equalizing unit in question is related to the primary pump 30 or the primary pump 31, and received in the other cylinders to yieldingly oppose the pressure of the oil supplied through such pipes are springs 94. Augmenting the said springs, there is provided a torque-equalizing line comprised of an open-end tube 95 working in an end-bore 96 of the respective racks, and pressure fed from a pipe, as 97 and 98 for the one and 99 and 100 for the other of the two torque-equalizing units, which is cut into the responsive pressure side of the related primary pump. By this I mean that, as pressure exerted through one of the pointer lines expresses the related rack forwardly and responsively causes the related primary pump to force the hydraulic fluid in one direction, the pressure of the eduction side is transmitted through the tube 95 to the opposite end of the rack. The development of a back-pressure exceeding a predetermined safe limit consequently overbalances the pressure applied upon the piston 88 and, in correspondence with the degree of the rack's return movement, reduces the volumetric discharge from the working pump. The manner by which movement of one or the other rack of a torque-equalizing unit revolubly influences the related pinion and causes the shaft 70 to move in one or the other direction by the threading action between the sleeve 82 and the worm 81—the other pinion being held stationary—is thought to be clear.

I refer now to Figs. 3 through 10, inclusive, for a detailed description of the distribution valves and the cross-overs therefor. The casings for these valves are formed with two chambers of which the one, indicated by 101, connects by the pipe 22, 23, 24, or 25 with the ram-cylinder A, A', B, or B', and of which the other, indicated at 102, connects by the pipe 32, 33, 34, or 35 with the pump 30 or the pump 31, as the case may be. I will term these chambers the ram chamber and the pump chamber. Providing communication between such chambers are two valved passages fitted with valves 103 and 104, each of such valves being of a spring-closing type and working against the pressure existing within the pump chamber. The springs for the valves are represented at 105 and 106. Carried as an integral extension upon the stem of the valve 104 at the end thereof remote from the spring is a piston 104', and secured to the casing of the valve proper is a bonnet 107 providing a cylinder for such piston. There is provided for such cylinder, end-wall and side-wall ports 108 and 109, respectively, of which the latter port is normally lapped by the piston, and connecting by suitable fittings with these ports are the pipes 42—43, 46—47, 52—53, or 56—57 of the several pointer lines. More particularly stated, the end-wall port of the cylinder connects with the pipe of a pointer line which leads from a pilot valve, and the side-wall port connects with the complementary pipe which leads to a related cylinder of a torque-equalizing unit.

Figure 8:
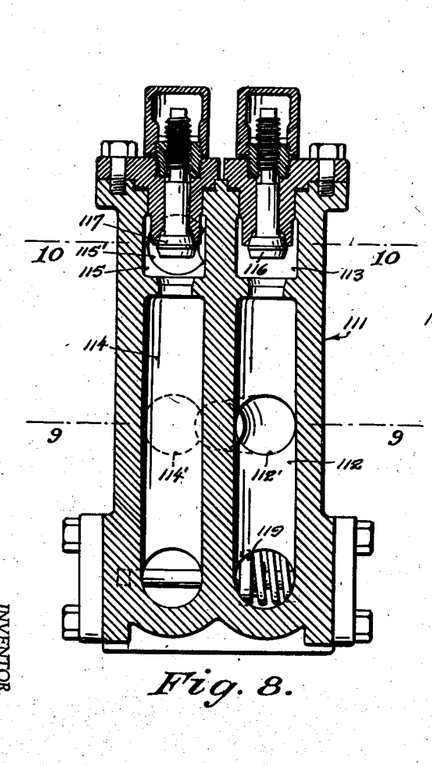
Fig. 8 is a transverse vertical section on line 8—8 of Fig. 6.
Figures 9, 10:
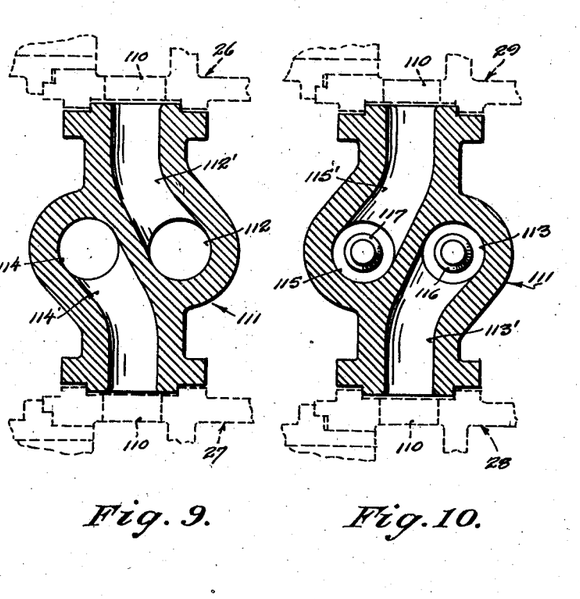
Figs. 9 and 10 are vertical sections on the respective section lines 9—9 and 10—10 of Fig. 8 to detail the flow ducts of the cross-over and indicating, by dotted lines, the connecting casings of the related distribution valves.

Provided in the ram chamber of each valve casing is a port 110 which, considering the four valves 26, 27, 28 and 29 to constitute two independent fluid systems, is arranged to normally find constant communication with a corresponding valve in the other system (Figures 8–10). This communication I provide through the instrumentality of a cross-over generally designated by 111, and which is formed with two paralleling passages each divided into two chambers which I designate by 112 and 113 in the instance of one passage and by 114 and 115 in the instance of the other passage. For each such passage there is provided a normally open manually-set valve, as 116 and 117, functioning as a closure between the two chambers. The chambers 112 and 114 lead through ducts 112' and 114' to ports at opposite sides of the cross-over whereat connection is had with the ports 110 of, say, the valves 26 and 27, and the chambers 113 and 115 lead through similar ducts 113' and 115' to oppositely disposed ports 110 of the other two valves 28 and 29. In consequence, there is provided in the normal operation of my steering mechanism a constant communication between the ram chambers of the two valves 26 and 28, and likewise between the ram chambers of the two valves 27 and 29, as will be clearly understood from an inspection of Fig. 3. Indicated in Fig. 7, it will be seen that I form the cross-over with normally-closed ducts leading in the one instance from the passage-chamber 112 to the passage-chamber 114, and in the other instance from the passage-chamber 114 to the passage-chamber 112, the closures therefor comprising pressure-relief valves 118 and 119, these valved ducts having the self-evident office of relieving excess pressure developing in either of the two fluid systems.

The operation of the equipment is as follows:

Assuming that the operator is using the upper of the two pilot valve-pilot pump units illustrated in Fig. 2, and a swing of the vessel to port is required, the cam 66 (Figure 11) is actuated to advance the shuttle element of the pilot valve sufficient to clear the port 60, whereupon pressure oil is delivered from pipe 61 through pipe 42 to the end-wall port 108 of the distribution valve 27. The piston 104' (Figure 3) is forced upwardly against the pressure of the spring 106 to obtain communication between the ram and pump chambers by the responsive opening of the valve 104, and simultaneously therewith the piston 104' clears the side-wall port 109 permitting the pressure oil from the pipe 42 to flow into the pipe 43 and therefrom into the cylinder 90 of the torque-equalizing unit 36, expressing the rack 86 rearwardly against the pressure of the springs 94 to responsively obtain a threading feed of the worm 81 into the sleeve 82 and, through the control rod 77, activating the pump 30 such that the prime fluid—drawn from ram-cylinder A' through the open valve 27 into the pipe 33—is forced outwardly through pipe 32 and therefrom into the pump chamber of the distribution valve 26. The pressure of the prime fluid opens the one-way valve 103, whereupon the fluid passes into the ram chamber 101 of the valve 26 and therefrom through pipe 22 into the ram-cylinder A. Coincident to this described movement of the prime fluid for the one ram 20, the prime fluid from the ram-cylinder B' is drawn through pipe 25 into the ram chamber 101 of the valve 29—both of the valves 103 and 104 therefor being closed—and passes by port 110 through the open passage 115'—115—114—114' of the cross-over 111 into the ram-chamber 101 of the valve 27, merging therein with the prime fluid from the ram-cylinder A' and being drawn through the open valve 104 into the induction side of the working primary pump 30. Similarly, the pressure flow of prime fluid branches within the ram chamber of the distribution valve 26 and, coincident with the pressure feed to the ram-cylinder A, passes by port 110 through the open passage 112'—112—113—113' of the cross-over into the ram chamber of valve 28 and therefrom through pipe 24 into the ram-cylinder B. Both rams consequently move in unison—oppositely directed—and are locked as the rudder reaches the desired swing by spring-influenced retraction of the pilot valve in response to functional disengagement of the related cam, permitting a return flow of the oil within the operating pointer line through by-pass 42' into pipe 42 and therefrom by the connecting ports 60 and 64 into the supply basin of the pilot pump 40, the valve 104 having been responsively closed with the pressure drop by the action of the spring 106, trapping the prime fluid against circulation and obtaining a cut-off of the working primary pump as the withdrawal of pressure from the pointer line acts through the springs 94 to return the control rod 77 to neutral. An opposite directive travel of the rudder is accomplished in a similar manner using the pilot valve 45 with a delivery of pressure oil from the pilot pump 40 through pipe 46 to the end-wall port 108 of the distribution valve 26 whereupon communication is established by the opening of what may be termed the return valve, namely the valve 104, between the two ram-cylinders A and B and the pipe 32, this latter pipe now becoming the induction pipe of the primary pump 30 which, by the pressure of oil flowing through pipe 47 into the cylinder 91 of the torque-equalizing unit 36, is reversely activated. The prime fluid, forced out through the eduction pipe 33, opens the valve 103 in the distribution valve 27 and, through the pipes 23 and 25—the latter through the instrumentality of the cross-over connection 114'—114—115—115'—is forced into the ram-cylinders A' and B'.

From the foregoing it is thought to be clear that both rams are caused to function by the selective use of what essentially constitutes two independently complete activating systems, the one said system comprising the pilot pump 40, pilot valves 41 and 45, distribution valves 26 and 27, torque-equalizing unit 36, and primary pump 30, and the other said system comprising the pilot pump 50, pilot valves 51 and 55, distribution valves 28 and 29, the torque-equalizing unit 37, and the primary pump 31. The ram chambers of the distribution valves in the inactive system are of course operating with the other and active pair of distribution valves through the medium of the cross-over, but considered as valves are entirely inoperative.

In connection with the operation of the activating systems, it should be pointed out that the pilot pumps which I employ are constant-pressure units, the import thereof being that the pressure responsible for expressing piston 88 rearwardly within the operating cylinder of the torque-equalizing unit being employed is a constant pressure working against the variable pressures transmitted from the pressure side of the related primary pump through pipe 95. In consequence, my torque-equalizing units perform their intended torque-equalizing function with an established predetermination of pressure reaction.

It may be here stated that compensation is made for volumetric changes within the oil chambers 72 of the torque-equalizing units—the result of axial travel of the shaft 70—by the instrumentality of connecting such chambers, as by the pipes 79 and 79', into the low-pressure side of the pilot pump, permitting a discharge of oil from the chamber as the worm 81 threads into the sleeve 82 and an admission of oil to the chamber responsive to a reverse travel of the worm.

In pointing out the purpose of the manually-set valves 116 and 117, it will be obvious that, upon occasion, it may become necessary to repair a distribution valve or one of the ram assemblies and this end I accomplish by providing the closures for the cross-over passages. It will be also pointed out (Fig. 1) that I have provided connecting lines between the two cylinders of each of the ram assemblies, denoted by 120 and 121, which are normally closed by respective valves 122 and 123, and that there are also provided, for the respective pipes 22, 23, 24 and 25, the valves 124, 125, 126 and 127 which are normally open, the purpose of the valves being to isolate either of the ram assemblies from the distribution valves where repair requirements demand. In accomplishing such a repair, and assuming that one of the associated distribution valves 26 or 27 is in need of repairs, the procedure is to close the hand-set valves 116 and 117 as well as the valves 124 and 125, and to open valve 122. The pump 31 is now employed and the operation of the system is in consequence confined entirely to the ram 21 and its related distribution valves 28 and 29, the ram 20 having simply an idling movement in that the oil may pass freely through line 120 between the two cylinders A and A'. Either of the two valves 26 or 27 may be taken down and dismantled, and the vessel is still maneuverable by the use of the single operating engine (ram 21) which is in no way effected by the isolation of the other hydraulic engine or the latter's valves 26 and 27. Should the hydraulic engine itself be in need of repairs, and having isolated the same as above described, the rod 18 need only be disconnected from the tiller arm 17, the other engine being still functional to the rudder.

While I have herein described steering mechanism in accordance with what I now consider to be my preferred embodiment, I do not intend thereby to necessarily limit myself in any respect, expecting that the language of the hereto annexed claims will be given as broad an interpretation as is commensurate with the state of the advance in the art.

What I claim is:

1. In combination with a prime-fluid system including a reversing primary pump and having a fluid-actuated motor connecting by separate valved pipes with the two sides of the pump, said valves being of a spring-closing character arranged to open in the direction of the motor; complementary pressure-responsive governor-elements functional by application of pressure to one of the same to activate the pump in one pumping direction and by application of pressure to the other said element to activate the pump in the other pumping direction; a pilot pump; and separate valve-controlled pointer lines for transmitting pressure from the pilot pump leading by separate pipes to certain of the valves of the prime-fluid system and therefrom to related governor-elements and acting, by selective opening of the said valves of the pointer lines, to open a related said prime-fluid valve against the pressure of its spring and obtain a succedent operation of the related governor-element and through the latter cause the prime fluid to be pumped through the pipes of the prime-fluid system in a direction such as causes the oil which is returning to the primary pump to flow past the valve of the prime-fluid system which has been opened by the pilot pump.

2. In combination with a prime-fluid system including a reversing primary pump and having a fluid-operated motor connecting by separate valved fluid-flow pipes with the two sides of the pump, said valves being of a spring-closing character arranged to open in the direction of the motor; devices including a pilot pump and having operative interconnection both with the valves and with the primary pump and acting by the pressure of the pilot pump to first open a selected said valve and then obtain a succedent operation of the primary pump such that the induction fluid for the primary pump passes the opened valve of the prime-fluid system and the eduction fluid passes another valve of the prime-fluid system by opening the latter against the pressure of its spring.

3. In combination with a prime-fluid system including a reversing primary pump and having a fluid-actuated motor connecting by separate pipes with the two sides of the pump; a control rod for the pump acting by movement in one direction from neutral to activate the pump for operation in one pumping direction and by movement in the other direction from neutral to activate the pump for operation in the other pumping direction; a pair of pistons; closed cylinders for the pistons; a pilot pump; separate connections from the pilot pump to the closed ends of the two cylinders for exerting the pressure of the pilot pump upon the pistons to express the pistons outwardly in the respective cylinders; coordinated valves operative to control the transmission of pressure from the pilot pump for actuating said pistons one at a time selectively; springs acting in opposition to the exerted pressure of the pilot pump for yieldingly returning the pistons; and operative interconnection between the pistons and the control rod functioning by movement of one piston in response to pressure from the pilot pump to actuate the control rod in one direction from neutral and by movement of the other piston in response to pressure from the pilot pump to actuate the control rod in the opposite direction from neutral.

4. In combination with a prime-fluid system including a reversing primary pump employing a control rod acting by movement in one direction from neutral to activate the pump for operation in one pumping direction and by movement in the other direction from neutral to activate the pump for operation in the other pumping direction, and having independently-acting pressure-responsive means one for actuating said control rod in one said direction from neutral and the other for actuating the control rod in the opposite direction from neutral; a pilot pump; separate connections from the pilot pump to the two said pressure-responsive means for transmitting the pressure of the pilot pump thereto; and coordinated valves for said connections operative to communicatively connect the high-pressure side of the pilot pump with either of said pressure-responsive means, selectively, while obtaining a coincident communication between the other pressure-responsive means and the low-pressure side of the pilot pump.

5. In marine-vessel steering apparatus providing a rudder and having a pair of pressure-responsive motors both coupled to the rudder and arranged to normally act in unison for operating the rudder while permitting the said rudder to be operated from one only of the two motors; a pair of fluid systems one for one and the other for the other of the two motors and each including a source of pressure energy and connection therefrom to the related motor for transmitting the pressure of the source to the motor; control devices for causing said energy sources to be selectively operative; normally open connection between the two systems operative to bring a selected active energy source into operating communication with the motor of the inactive energy source for actuating the latter as well as its own motor; and valve means for closing said last-named connection to preclude a transfer of fluid from the said active energy source to the motor of the system of the inactive energy source.

6. In marine-vessel steering apparatus providing a rudder and having a pair of hydraulic engines both coupled to the rudder and arranged to normally act in unison for operating the rudder, each said engine comprising a ram working in opposed cylinders, the combination with the rudder and with the two hydraulic engines: a pair of pumps; a respective fluid-flow pipe for each of the opposed cylinders of said engines; connection from one pump to the two fluid-flow pipes of one engine and connection from the other pump to the two fluid-flow pipes of the other engine; valve devices in said fluid-flow pipes, the valve devices for the fluid-flow pipes of one engine being independent of the valve devices for the fluid-flow pipes of the other engine; means for controlling the opening of said valves and for causing said pumps to be operated selectively to pump eduction fluid into one and draw induction fluid from the other of the two pipes related to the active pump, giving eduction and induction significance to the two pipes, selectively; and separate cross-over connections between the fluid-flow pipes of one and the fluid-flow pipes of the other engine normally operating to cause a selected active pump to be operative to the engine of the inactive pump as well as its own engine, said cross-over connections being disposed between the valve devices and the engines.

7. Structure according to claim 6 having a fluid-flow pipe directly connecting the two opposed cylinders of each hydraulic engine and fitted with a normally closed manually operated valve; and normally open manually operated valves for each of said cross-over connections, the valves for the first-named fluid-flow pipes lying between the cross-overs and the cylinders of the engines.

8. In marine-vessel steering apparatus: the combination of a hydraulic engine; a primary pump; pressure-responsive means for controlling the operation of said pump; a pilot pump; a hydraulic connection from the pilot pump to said pressure-responsive control means; a second hydraulic engine; a second primary pump; a second pressure-responsive means for controlling the operation of said second primary pump; a second pilot pump; a second hydraulic connection from the second pilot pump to said second pressure-responsive control means; control devices for operating said pilot pumps selectively; hydraulic connections between the primary pumps and the engines operative to actuate both the engines from either of the selectively operated primary pumps; and spring-closing valves in said last-named hydraulic connections opened in the instance of one valve by pressure exerted from an operating pilot pump and in the instance of the other valve by pressure of fluid forced from the related primary pump and acting in their normal closed positions to trap the hydraulic fluid against circulatory movements within the last-named hydraulic connections.

9. In marine-vessel steering apparatus having a pair of fluid motors arranged to be employed singly or together for actuating the rudder, and a pair of selectively used pumps: the combination of ostensibly independent and self-sufficient fluid systems for the two motors of which each system incorporates one of the pumps, and has cross-over connection with the other system functioning in the normal use of the apparatus and by a selective activation of either said pump to render the active pump operative to the motor of the system of the inactive pump as well as the motor of the system of said active pump; and manually-set valves for said cross-over connections which, by their closing, serve to preclude a transfer of fluid from said active pump to the motor of the system of the inactive pump.

10. In marine-vessel steering apparatus having a pair of fluid motors arranged to be employed singly or together for actuating the rudder: the combination of ostensibly independent and self-sufficient fluid systems for the two motors respectively providing a pressure source and having separate and normally closed fluid-flow pipes connecting the motor with the pressure source in the instance of each system; control means operative to the closures for said pipes and to the pressure source of a selected said system for causing a pressure flow of fluid to circulate in either direction, selectively, through the pipes of the selected system to responsively operate the motor of the selected system; fluid-flow connections acting in the normal use of the apparatus to cause fluid to also flow to and from the other system for causing both of the motors to operate by activation of a single selected pressure source; and means operable at will for closing the fluid-flow connection last recited and by said closing limiting the fluid which flows to and from a selected activated pressure source to the fluid-flow pipes of the related system only.

11. In marine-vessel steering apparatus having a pair of fluid motors for actuating the rudder: the combination of ostensibly independent fluid systems for the two motors respectively providing a reversing pump and having separate fluid-flow pipes connecting the motor with the two sides of the pump and serving interchangeably one as the output to conduct fluid from and the other as the input to return fluid to the pump, and each said pipe being fitted with a check valve opening in the direction of the motor and having a complementary normally-closed by-passage about the check valve; control means operatve to open a selected by-pass of either said system and to responsively activate the pump of that system for initiating a motor-operating circulation of fluid through the system of the opened by-pass and in a direction causing a return flow of fluid through the by-pass so opened; and means by which fluid circulating through one of said systems in response to the activation of a selected pump is caused to also flow to and from the other system for operatively connecting both of the motors to the single active pump.

12. In marine-vessel steering apparatus having a pair of fluid motors for actuating the rudder: the combination of fluid systems for the two motors respectively providing a reversing pump, and having separate fluid-flow pipes connecting the motor with the two sides of the pump in the instance of each system and serving interchangeably one as the output and the other as the return line, each of said pipes being fitted with a check valve arranged to open in the direction of the motor and having a valved by-pass about the check valve; control devices operative to open the valve of a selected by-pass of either said system and to responsively activate the pump related thereto for initiating a motor-operating circulation of fluid through the system of the opened by-pass and in a direction causing a return flow of fluid through the by-pass so opened; and cross-overs between the pipes of one and the pipes of the other system, said cross-overs being separated from the pumps by the valves of the respective systems, acting to communicatively connect the motor ends of the two systems and thereby operate both motors from a single active pump.

13. Steering apparatus according to claim 12 in which, for closing the cross-overs, the cross-overs are fitted with normally-open manually set valves.

14. In combination with a fluid system including a reversing pump, a governor therefor, and having a fluid-actuated motor connecting by separate pipes with the two sides of the pump and serving interchangeably one as a fluid-output and the other as a fluid-return line; spring-closing check valves in each of said connecting pipes arranged to open in the direction of the motor; a by-pass about each said check valve; a spring-closing valve for each by-pass arranged to open in a direction corresponding to the check valves; and separate control devices having operative connection on the one hand with one of the by-pass valves and on the other hand with the other by-pass valve, and each also operatively connected with the governor for the pump, and acting to open the by-pass valves selectively, each against the pressure of its spring, and obtain a succedent operation of the governor such as will activate the latter to responsively operate the pump and effect circulation of fluid through the pipes of the system in a direction causing a return flow of fluid through the by-pass so opened.

15. In combination with a prime-fluid system including a primary pump, providing a motor having hydraulic connection with the pump and operated therefrom, and having a valve in said connection which, by its opening, permits the hydraulic flow of the pump to return from the motor: devices operative to govern said valve and to control the primary pump comprising a pilot pump; means responsive to the pressure of the pilot pump for opening said valve; normally inactive means for actuating the primary pump; means responsive to the pressure of the pilot pump for activating said pump-actuating means; and operative interconnection from said pilot pump to both of the means and arranged and adapted to cause the exerted pressure of the pilot pump to first open said valve and then obtain a succedent operation of the primary pump.

TYLER W. SPRAKE.

REFERENCES CITED

The following references are of record in the file of this patent:

UNITED STATES PATENTS

| Number | Name | Date |
|---|---|---|
| 1,056,194 | Martineau | Mar. 18, 1913 |
| 1,150,831 | Benes | Aug. 17, 1915 |
| 1,292,029 | Paine | Jan. 21, 1919 |
| 1,550,550 | McCauley | Aug. 18, 1925 |
| 1,590,226 | Boisset | June 29, 1926 |
| 1,955,922 | Lamond | Apr. 24, 1934 |
| 2,182,289 | Eisenlohr | Dec. 5, 1939 |
| 2,185,277 | Stelzer | Jan. 2, 1940 |
| 2,189,460 | Derhammer | Feb. 6, 1940 |
| 2,210,555 | Podolsky | Aug. 6, 1940 |
| 2,236,467 | Clench | Mar. 25, 1941 |
| 2,282,194 | Lamond | May 5, 1942 |
| 2,287,960 | Ballard | June 30, 1942 |
| 2,288,076 | Erling | June 30, 1942 |

FOREIGN PATENTS

| Number | Country | Date |
|---|---|---|
| 262,245 | Great Britain | Dec. 9, 1926 |
| 360,458 | Great Britain | Nov. 2, 1931 |
| 516,091 | Great Britain | Dec. 21, 1939 |